Jan. 16, 1968  H. G. TURNBULL  3,363,495

DRIVE WHEEL FOR BAND SAWS

Filed Jan. 19, 1966  3 Sheets-Sheet 1

Inventor
Hugh G. Turnbull
By Ira Milton Jones
Attorney

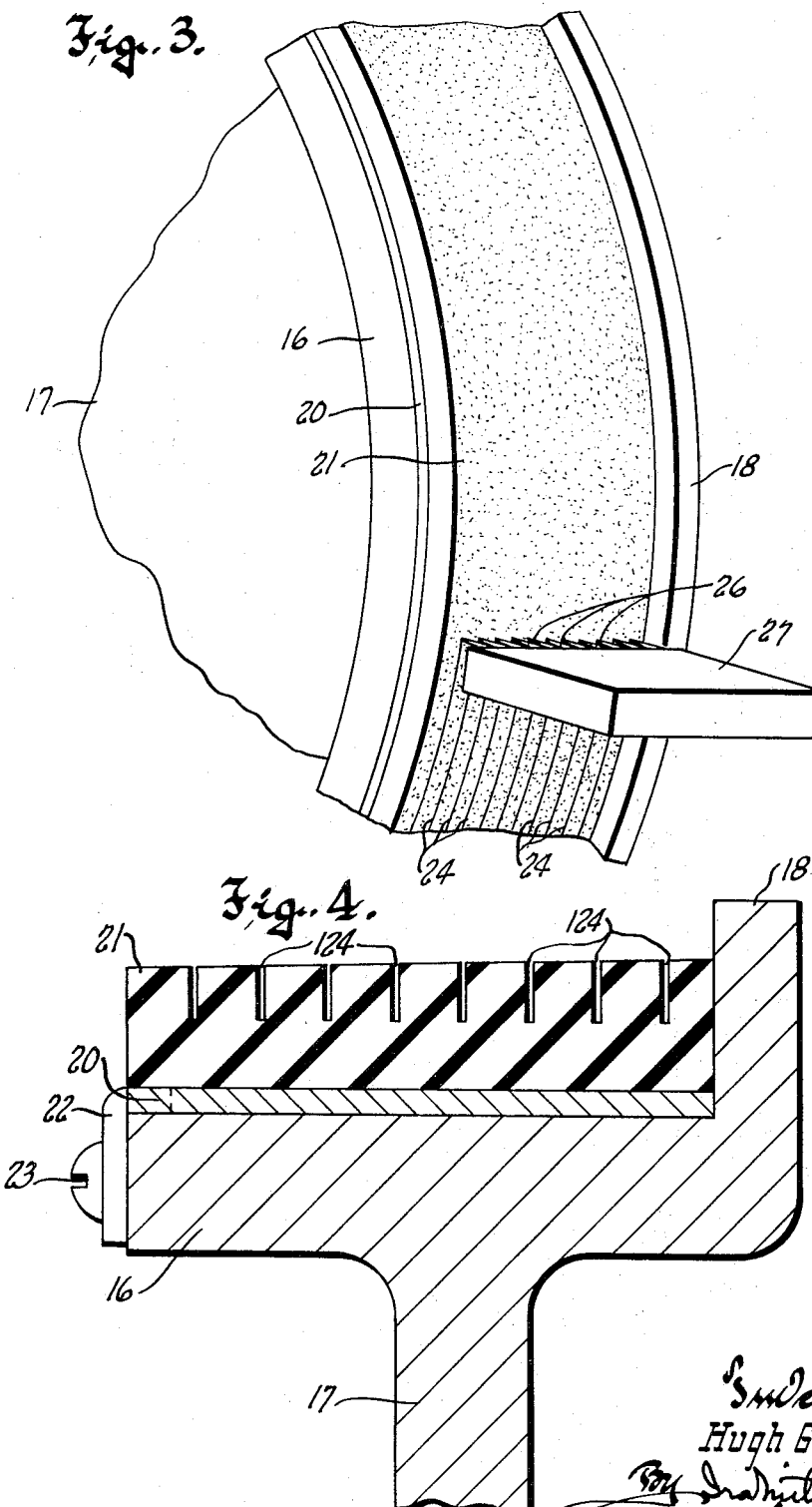

Jan. 16, 1968  H. G. TURNBULL  3,363,495
DRIVE WHEEL FOR BAND SAWS
Filed Jan. 19, 1966  3 Sheets-Sheet 3
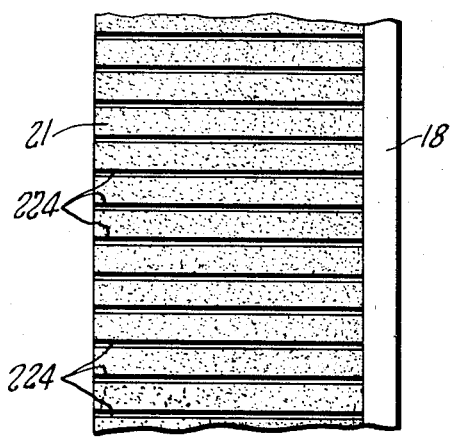
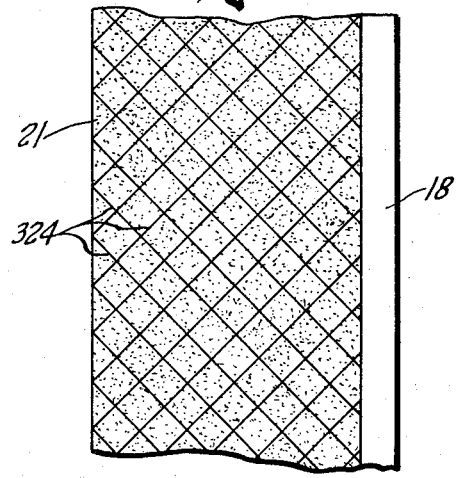
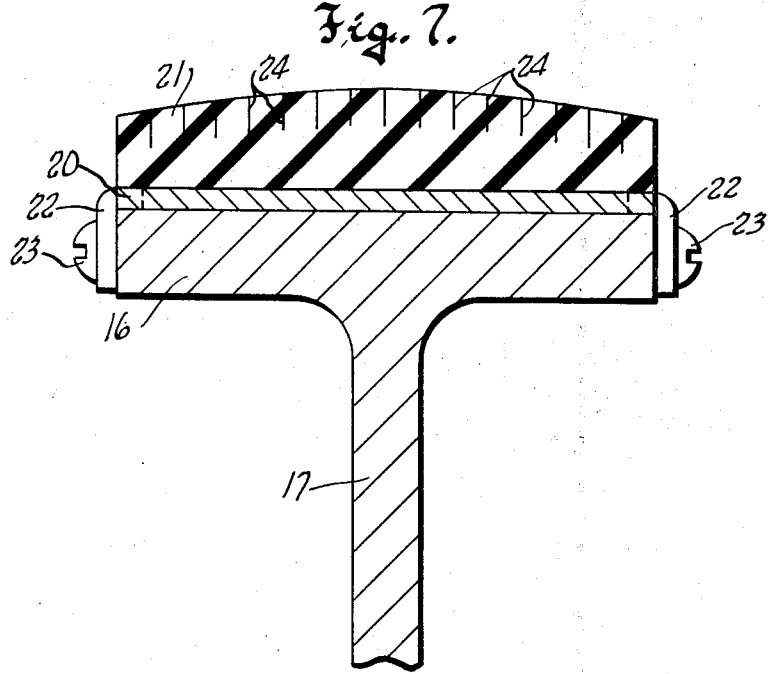
INVENTOR
Hugh G. Turnbull
BY Grahnettan Jones
Attorney

United States Patent Office 3,363,495
Patented Jan. 16, 1968

3,363,495
DRIVE WHEEL FOR BAND SAWS
Hugh G. Turnbull, Minneapolis, Minn., assignor to Continental Machines, Inc., Savage, Minn., a corporation of Minnesota
Filed Jan. 19, 1966, Ser. No. 521,707
4 Claims. (Cl. 83—13)

This invention relates generally to band saws, and pertains more particularly to improvements in the wheels around which the saw band of a band saw are trained under tension.

The band saw, although fundamentally a rather old machine tool, has been the subject of much attention in recent years with a view to increasing its versatility and its production rate. Recent band saw developments have been particularly directed to the adaptation of the band saw to high production straight sawing of metal and other substantially hard materials, and from these efforts there has evolved a type of band machine which is usually known as a cut-off saw and which features the capacity to make straight, clean cuts very rapidly.

As is well known, the saw band of a band machine is usually trained under tension around the peripheries of a pair of radially aligned, spaced apart band wheels that rotate on substantially parallel axes, one of said band wheels being freely rotatable and the other being a powered drive wheel that imparts lengthwise movement to the band.

In order to attain a high production rate, cut-off saws are intended to be operated with relatively high feed forces, so that each tooth of the band, as it advances across a workpiece, will take a cut of optimum depth. Obviously substantial linear force must be applied to the band in order to overcome the drag resulting from high feed forces at the desired high rate of lengthwise band travel, and, in turn, the linear force which can be imparted to the band depends, among other things, upon the traction between the drive wheel and the band.

As cut-off saw production rates have increased, the attainment of sufficiently good traction between the drive wheel and the saw band has presented increasing difficulties. An important factor in this problem has to do with the necessity for cooling and lubricating the band. When a cutoff saw is in use, its saw band is constantly washed or flooded, in the neighborhood of the cutting zone, with a liquid lubricating coolant, and a substantial film of that coolant clings to the band as it moves into engagement with the drive wheel. Such fluid of course acts as a lubricant between the engaging surfaces of the band and the drive wheel, tending to promote undesired slippage between them.

In the past, various expedients have been employed for achieving the necessary traction between the drive wheel and the band. See, for example, Patent No. 2,954,061, issued Sept. 27, 1960 to E. J. Stordal, which discloses and claims a band wheel having a metal flange against which the back edge of the saw band can engage and having a tire of rubber-like material on which the band rides and which tire has an axial taper of about 3°, converging away from the flange.

As brought out in the Stordal patent, the drive wheel therein claimed and disclosed was extremely convenient and versatile. Its resiliently soft tire enabled it to be used with saw bands of practically any desired width, owing to the fact that the teeth on the band could engage the tire under the force of substantial lengthwise band tension without sustaining any damage from the tire.

But while the band wheel of the Stordal patent provided adequate driving traction with a highly lubricated saw band at cutting rates as high as 10 sq. in. per minute in mild steel, recent advances in cutoff machines have made it possible to go to cutting rates upwards of 50% higher than the maximum available with a drive wheel of the Stordal patent. Such increased cutting rates once again posed the problem of achieving adequate traction between the drive wheel of a band saw machine and a lubricated band trained thereover.

Having in mind both the advantages and the disadvantages of the band wheel of the Stordal patent, it is the general object of the present invention to provide a band wheel having a tire of rubber-like material, and which can therefore be used with saw bands of practically any desired width, and which band wheel is nevertheless capable of transferring to a saw band trained therearound much higher driving forces than where attainable with the band wheel of the Stordal patent, making possible the use of cutting rates of upwards of 30 sq. in. per minute in mild steel without slippage between the driving band wheel and the band.

It is also a general object of this invention to provide a method of producing, on a band wheel for band saws, cut-off saws and the like, an inexpensive high traction surface of the character described.

More specifically it is an object of this invention to provide a band wheel on which there is a tire of rubber-like material having slits in its circumferential surface that are adapted to provide lodgments for cutting chips brought to the wheel by the band in the normal operation of the saw, whereby such chips can become effectively embedded in the circumferential surface of the tire to roughen it and provide for frictional engagement between the wheel and the saw band by which slippage between them is prevented.

Thus it can be said to be another object of this invention to provide a very simple and effective expedient for achieving a high friction surface on a band wheel of a saw band machine, which frictional surface tends to maintain its roughness in direct consequence of normal operation of the machine.

With the above and other objects in view which will appear as the description proceeds, this invention resides in the novel method and construction, combination and arrangement of parts substantially as hereinafter described and more particularly defined by the appended claims, it being understood that such changes in the precise embodiments of the herein disclosed invention may be made as come within the scope of the claims.

The accompanying drawings illustrate several complete examples of physical embodiments of the invention constructed according to the best modes so far devised for the practical application of the principles thereof, and in which:

FIGURE 3 is a fragmentary perspective view illustrating one manner of slitting the tire of a band wheel for the purposes of the present invention;

FIGURE 4 is a cross-sectional view of a band wheel incorporating a modified embodiment of the invention;

FIGURES 5 and 6 are fragmentary elevational views showing other modified embodiments of the invention; and FIGURE 7 is a view generally similar to FIGURE 4 but illustrating still another modification of the invention.

Figure 1:
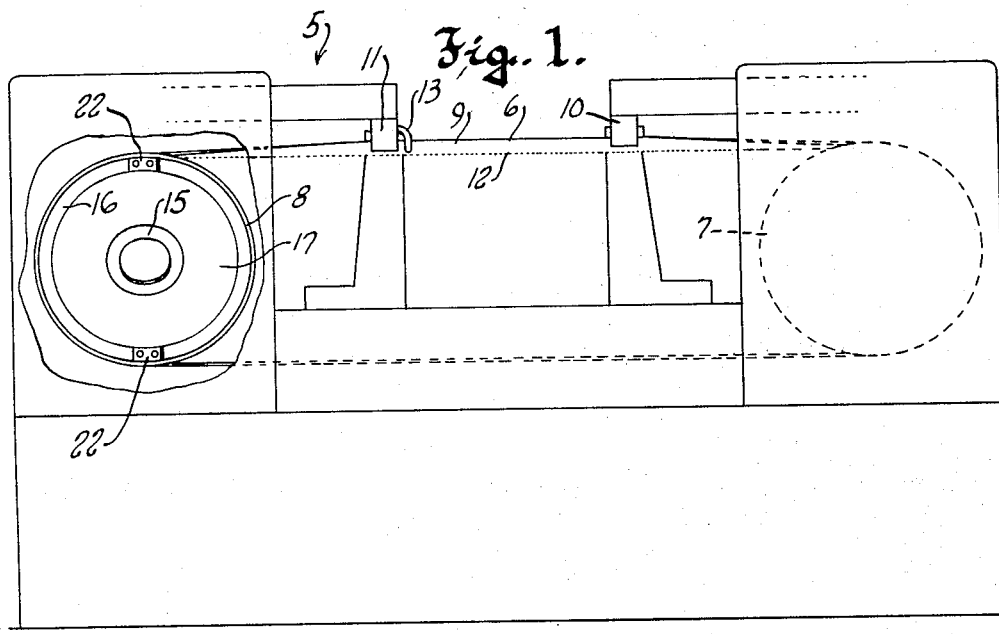
FIGURE 1 is a front elevational view of a cut-off saw incorporating band wheels embodying the principles of the present invention.
Figure 2:
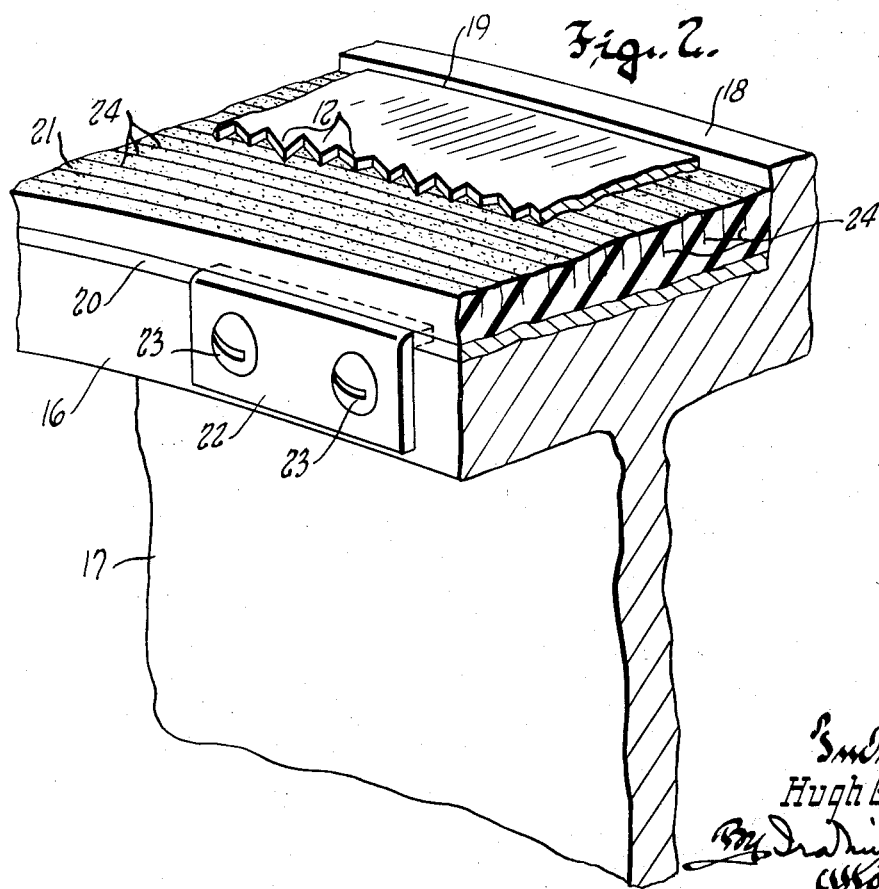
FIGURE 2 is a fragmentary perspective view on a larger scale of a portion of a band wheel embodying the present invention.

Referring now to the accompanying drawings, the numeral 5 designates generally a more or less conventional band sawing machine of the type which comprises an endless saw band or blade 6 trained under tension around a pair of band wheels 7 and 8, with one straight stretch 9 of the blade extending through a cutting zone at which it is adapted to be engaged with a piece of work to be cut. One of the band wheels, in this case the wheel 8, is power driven in any suitable way; and the other band wheel is freely rotatable.

The machine illustrated in FIGURE 1 is of the type generally referred to as a cut-off saw in which the cutting stretch of the saw band extends horizontally and the band wheels rotate on substantially horizontal parallel axes, but it should be understood that the band wheel of this invention is also useful on conventional band saws wherein the cutting stretch of the band extends vertically through the work supporting table.

As the band of the cut-off saw enters and leaves the cutting zone, it passes through guides 10 and 11 by which it is twisted and held with its teeth 12 facing downwardly in the cutting zone. It will be understood that suitable means (not shown) are provided for either feeding the cutting stretch of the band downwardly or feeding workpieces upwardly.

In or near the cutting zone a stream of liquid lubricating coolant issues out of a suitable applicator outlet 13 onto the band, and a certain amount of this liquid clings to the band all through the remainder of its circuit, providing a very slippery film or coating on both the band and the circumferential surfaces of the band wheels around which it is trained. Heretofore this film of lubricant on the band has been considered undesirable in two respects. First and most obviously, it tended to promote slippage between the driven band wheel and the band so that the band was not advanced lengthwise at the desired rate against the resistance offered by the workpiece being cut. Second, the film of liquid on the band caused cutting chips to adhere to the band and to be carried between the opposing surfaces of the band wheel and the band, where the chips caused some vibration, produced instability in the position of the band on the wheel, and were otherwise undesirable, especially where the wheel had a metal tread as is the case in many band saws.

The present invention converts that inherent objection into a virtue by providing means for utilizing the cutting chips carried by the lubricant film on the band to produce a high friction surface on the band wheels that will assure good traction between the band wheels and the band despite the presence of the slippery film of lubricating coolant, all without causing any variation in band tension, instability of the band on the wheel, or other undesired consequences.

In general, the band wheel of this invention comprises a hub 15, a felly portion 16, and a web 17 connecting the hub and felly portions. As in the band wheel of the Stordal patent, the wheel may have a flange 18 which is preferably integral with its felly portion and which is located at one side of the wheel to provide a shoulder against which the back edge 19 of the blade is adapted to engage. However, as shown in FIGURE 7, the invention is also useful on conventional crowned wheels which have no such flange.

Closely fitted around the rim or felly portion of the wheel is a removable metal hoop 20 having a tread or tire 21 of rubber-like material such as neoprene or the like bonded to its outer surface. The hoop is secured against both axial and rotational displacement with respect to the wheel by means of clips 22, which are detachably secured, as by screws 23, to the face of the rim which is remote from the flange 18, or in the case of the crowned wheel shown in FIGURE 7 by the securement of such clips to both sides of the rim. The manner of connecting the hoop to the wheel thus follows the Stordal patent to which reference may be had for a more detailed disclosure of this feature.

In the flanged wheel the tire 21 has its circumferential surface tapered slightly so that it defines a conical frustum, the taper, however, being only about 3° and being convergent away from the flange, so that the back edge 19 of the saw band tends to be maintained in engagement with the flange. The width of the tire (i.e., its dimension axially of the wheel) is greater than the width of the widest saw band normally expected to be used on it, so that the teeth of the saw band lie on the tire as the band traverses the wheel. The resiliently soft material of the tire of course causes no damage to the saw teeth, and therefore the wheel can be used with a band of any desired width.

In the wheel of the present invention excellent traction between the wheel and the saw band is assured by reason of the provision of a plurality of slits 24 in the tire that open to its circumferential surface and extend radially partway into it. The direction in which these slits extend is not critical, as will appear hereafter, but it is very desirable that they be spaced from one another laterally at fairly close intervals and that there be such slits all around the wheel periphery.

The purpose of the slits 24 is to serve as lodgments for cutting chips which are inevitably brought to the wheel by the band in the course of operation of the machine, and which are carried by the film of lubricating coolant fluid on the blade. The chips that are lodged in these slits of course provide numerous hard, jagged points that can penetrate the oil film on the blade and engage the blade with excellent tractive effect. Contrary to what might be expected, the cutting chips thus lodged in the tire do not cause it to wear or deteriorate with any undue rapidity, probably because the chips have very little motion relative to the material of the tire (owing to its resilience) and therefore do not tend to cut into it.

In this connection it should be observed that the slits extend only partway into the tire, so that the resilience of the tire material can be relied upon to urge the side surfaces of the slits into snug clamping relationship with the cutting chips.

FIGURE 3 illustrates more or less diagrammatically one method of cutting the slits 24 into the tire. A plurality of cutting elements 26, which can be similar to old fashioned phonograph needles, is mounted in a suitable holder 27, and the holder is secured in fixed relation to a wheel on which the tire is mounted. The wheel is rotated with the cutting elements forcefully engaging the tire so that they cut into it and produce axially spaced parallel cuts around the tire. Obviously a variant of this procedure is possible, using a single cutting element which is advanced axially across the tire at a steady rate as the wheel is rotated through a number of revolutions, in order to produce a helical slit.

FIGURE 4 illustrates a modified embodiment of the invention in which the slits 124 in the tire comprise substantially narrow grooves that are molded into the tire or formed by removal of narrow strips of material. The grooves 124 should not be wider than about .030", in order to insure that they will afford sufficiently tight lodgment for cutting chips.

It will be understood that if the slits in the tire extend circumferentially, they should be spaced apart by such distances as to assure good traction with blades of any width. Thus if saw bands different in width by ⅛ in. increments are to be used with the wheel, the slit nearest the flange should be spaced about ¹⁄₁₆ in. therefrom, and the several slits should be spaced apart at ⅛ in. intervals.

Of course the slits need not extend circumferentially. As illustrated in FIGURE 5, slits 224 could extend transversely to the tire, that is, axially with respect to the wheel; or, as illustrated in FIGURE 6, slits 324 can be arranged in a criss-cross pattern, with all slits extending obliquely to the wheel axis. But regardless of their arrangement or pattern, the important consideration is that the interruptions formed by the slits in the continuity of the surface of the tire should be capable of receiving and gripping the chips which are carried to the tire by the coolant coated saw band.

It has been found that a few circuits of the band during cutting are sufficient to cause enough chips to be lodged in the tire to provide a very effective tractive surface thereon. Obviously the supply of such chips is constantly replenished all during operation of the machine, so that there is never any danger of the wheel losing its tractive surface. Thus, as long as the "mouths" of the pockets or lodgments formed by the slits are narrow enough or small enough, the objectives of the invention will be achieved. For this reason, as shown in FIGURE 4, the slits can be formed either by molding the tire with narrow grooves or by cutting narrow grooves into the surface of the tire.

Since the shape or pattern of the interruptions in the tire surface formed by the slits or narrow grooves, or the manner in which they are formed is not important, except perhaps from the standpoint of economical and practicable production, it should be understood that where the term "slits" is used herein and in the appended claims, any pocket-forming interruptions in the tire surface, whether continuous, interrupted or otherwise, is contemplated and embraced, providing these surface interruptions are capable of receiving and gripping the chips that are brought to the tire by the saw band trained thereover.

From the foregoing description taken with the accompanying drawings it will be apparent that this invention provides a band wheel for band sawing or cutting machines which can be used with bands of substantially any desired width and which takes advantage of the tendency of cutting chips to cling to the inevitable film of lubricating coolant fluid on the band, to produce a tractive surface on the wheel which prevents slippage between the band and the wheel despite the presence of such film.

What is claimed as my invention is:

1. A band wheel for a band saw of the type wherein an endless saw band is trained around the circumferential faces of band wheels and wherein a liquid lubricating coolant is applied to the saw band, said band wheel being characterized by:
   a tire of rubber-like material around the circumferential face of the wheel having slits in its surface which extend radially partway into the tire and form pockets in which cutting chips can lodge to increase the frictional grip between the saw band and the wheel.

2. In a band type metal sawing machine having an endless saw band trained around the circumferential faces of driven and freely rotatable band wheels, of which at least the driven band wheel has a tire of rubber-like material on its felly, and which machine has means for applying liquid lubricating coolant to the saw band in a cutting zone between the band wheels, that improvement which comprises:
   the tire of the driven band wheel having a plurality of laterally spaced slits opening to its peripheral surface and extending radially partway thereinto, which slits provide lodgments for cutting chips carried by the saw band whereby such chips provide said tire with a rough surface which insures good traction between the driven wheel and the saw band without interfering with yielding of the tire to teeth on the saw band.

3. In a band type sawing machine having an endless saw band trained around band wheels and means for applying liquid lubricating coolant to the saw band in a cutting zone between the band wheels, and wherein one of said band wheels is power driven to impart lengthwise motion to the saw band and has a tire of rubber-like material on its felly to accommodate saw bands of different widths without damage to their teeth, means for enhancing traction between the driven band wheel and the saw band comprising:
   a plurality of laterally spaced slits in the tire of the driven band wheel opening to its surface and extending radially partway into the tire.

4. The method of producing a high traction surface on a band saw wheel having a tire of rubber-like material around the periphery of which a saw band can be trained under tension, to enable the tire to have good frictional engagement with the band despite liquid lubricating coolant on the band, said method comprising:
   (A) providing a tire with a plurality of laterally spaced slits in the circumferential face thereof and which extend radially only partway thereinto; and
   (B) operating the band wheel on a band saw, with a saw band trained therearound, with the application of liquid lubricating coolant to the saw band and with the saw band cutting metal, so as to cause metal cutting chips to be carried to the tire by the saw band and to become lodged in said slits.

References Cited

UNITED STATES PATENTS

| 1,280,341 | 10/1918 | Wardman | 83—169 X |
| 2,081,033 | 5/1937 | Birdo | 143—30 X |
| 3,034,387 | 5/1962 | Sebastian | 83—201 X |

JAMES M. MEISTER, *Primary Examiner.*